United States Patent [19]

Friedrich et al.

[11] 4,414,134

[45] Nov. 8, 1983

[54] IMPREGNATING CATALYSTS

[75] Inventors: Maria S. Friedrich, Lyndhurst; Dev D. Suresh, Macedonia; Robert K. Grasselli, Chagrin Falls, all of Ohio

[73] Assignee: The Standard Oil Co., Cleveland, Ohio

[21] Appl. No.: 222,820

[22] Filed: Jan. 5, 1981

[51] Int. Cl.³ .................. B01J 27/14; B01J 21/02; B01J 27/02; B01J 29/16

[52] U.S. Cl. .................... 502/204; 502/213; 502/210; 502/215; 502/248; 502/249

[58] Field of Search ............... 252/432, 437, 439, 456

[56] References Cited

U.S. PATENT DOCUMENTS

| | | | |
|---|---|---|---|
| 2,904,580 | 9/1959 | Idal | 260/465.3 |
| 3,280,166 | 10/1966 | Callahan et al. | 260/465.3 |
| 3,354,197 | 11/1967 | Callahan et al. | 260/465.3 |
| 3,362,998 | 1/1968 | Callahan et al. | 260/604 |
| 3,415,886 | 12/1968 | McClellan | 260/603 |
| 3,440,180 | 4/1969 | Kiff et al. | 252/439 |
| 3,467,716 | 9/1969 | Kiff et al. | 260/604 |
| 3,496,117 | 2/1970 | Vesely et al. | 252/465 |
| 3,551,470 | 12/1970 | Shaw et al. | 260/465.3 |
| 3,629,148 | 12/1971 | Dominik et al. | 252/437 |
| 3,642,930 | 2/1972 | Grasselli et al. | 252/437 X |
| 3,712,912 | 1/1973 | Hausweiler et al. | 260/465.3 |
| 3,741,910 | 6/1973 | Shiraishi et al. | 252/437 |
| 3,764,632 | 10/1973 | Takenaka et al. | 252/432 X |
| 3,801,670 | 4/1974 | Shiraishi et al. | 252/437 X |
| 3,907,713 | 9/1975 | Grasselli et al. | 252/462 |
| 3,925,250 | 12/1975 | Hausweiler et al. | 252/437 |
| 4,012,449 | 3/1977 | Shikakura et al. | 252/432 X |
| 4,052,332 | 10/1977 | D'Amere et al. | 252/413 |
| 4,151,116 | 4/1979 | McDermott | 252/437 X |
| 4,155,938 | 5/1979 | Yamamoto et al. | 252/432 X |
| 4,162,234 | 7/1979 | Grasselli et al. | 252/432 |
| 4,166,808 | 9/1979 | Daumar et al. | 252/456 X |
| 4,250,339 | 2/1981 | Sakamoto et al. | 252/432 X |
| 4,272,637 | 6/1981 | Yamamoto et al. | 252/437 X |

FOREIGN PATENT DOCUMENTS 878803 10/1961 United Kingdom .

Primary Examiner—Delbert E. Gantz
Assistant Examiner—William G. Wright
Attorney, Agent, or Firm—J. E. Miller, Jr.; H. D. Knudsen; L. W. Evans

[57] ABSTRACT

An element selected from Groups IA, IB, IIB, IIIA and IIIB is incorporated into an iron bismuth molybdate oxide complex catalyst by impregnation.

8 Claims, No Drawings

IMPREGNATING CATALYSTS

BACKGROUND OF THE INVENTION

The present invention relates to improved oxide complex catalysts for use in various oxidation-type reactions such as, for example, the oxidation of propylene or isobutylene to produce acrolein and acrylic acid or methacrolein and methacrylic acid respectively, the ammoxidation of propylene or isobutylene to produce acrylonitrile or methacrylonitrile, respectively, or the oxydehydrogenation of isoamylenes to produce isoprene.

Iron bismuth molybdate oxidation catalysts are well known and many different promoters have been proposed for such systems. See, for example, U.S. Pat. No. 3,642,930, in which alkali metals and optionally cobalt and/or nickel are disclosed as useful. See also U.S. Pat. No. 4,123,453 wherein the Group II elements are proposed.

Although known catalysts exhibit good catalytic properties, it is always beneficial to provide new catalysts having even better catalytic properties.

Accordingly, it is an object of the present invention to provide a new technique for making catalysts of improved catalytic properties.

SUMMARY OF THE INVENTION

This and other objects are accomplished by the present invention which is based on the discovery that iron bismuth molybdate oxide complex catalysts promoted with Group I, II and/or III elements of improved catalytic performance can be obtained provided that at least some of the Group I, II or III elements are incorporated into the catalyst by impregnation of a preformed and calcined iron bismuth molybdate oxide complex.

Thus, the present invention provides an improvement in the known process for producing an oxidation catalyst comprising a substantially crystalline iron bismuth molybdate oxide complex the improvement wherein at least a portion of one or more elements in the catalyst selected from Groups IA, IB, IIB, IIIA and IIIB of the Periodic Table is incorporated into the catalyst by impregnation and further wherein none of the Group IA elements incorporated into the catalyst by impregnation is derived from a molybdate or silicate.

DETAILED DESCRIPTION

Catalysts to which the present invention applies (i.e. final catalyst product) are substantially crystalline oxide complexes having the following general formula:

$$A_aB_bC_cBi_dFe_eMo_fO_x$$

wherein A is at least one element selected from the Group IA, IB, IIA, IIB, IIIA and IIIB elements;
B is on or more Group VIII elements other than Fe, preferably Co and/or Ni and optionally Cr and/or Mn;
C is P, As, Sb, S, Te and/or Sn;
and wherein
a is 0.1–12;
b is 0.1–12;
c is 0.1–12;
d is greater than 0–12;
e is 0.1–12;
f is 0.1–12; and
x is a number determined by the valence requirements of the other elements present;
and further wherein the molybdenum content is greater than the contents of any other element in the catalyst, excluding oxygen.

Preferably, a is 0.1 to 6, b is 0.1 to 12, c is 0.1 to 12, d is greater than 0 to 4, e is 0.1 to 12 and f is 12.

The above catalysts normally contain at least some alkali metal. Also, the bismuth content is usually 0.1 to 5, preferably 0.5 to 2, more preferably about 1, based on 12 atoms of molybdenum. In addition, the iron content is normally about 1 to 5, preferably 1.5 to 4, more preferably 2 to 3, based on 12 atoms of molybdenum.

Especially preferred catalysts are those defined by the following formula:

$$I_mII_nIII_oB_pD_qFe_rBi_sMo_tO_x$$

wherein
I is at least one Group I element, preferably K, Rb, Cs and/or Cu;
II is at least one Group II element, preferably Mg, Ca and/or Zn;
III is at least one Group III element, preferably Al and/or Tl;
B is at least one of Co, Ni, Mg and optionally Mn and/or Cr;
D is P, As, Sb, Te and/or Sn;
and wherein
m is 0 to 1;
n is 0 to 12;
o is 0 to 12;
p is 0 to 10;
q is 0 to 6;
r is 1 to ½ t;
s is 0.5 to ½ t;
t is 8 to 16;
x is a number determined by the valence requirements of the other elements present, The catalysts of the invention can be either unsupported or supported. If supported, conventional supports such as silica, alumina, Alundum, zirconia, titania and the like can be employed. Any amount of support can be employed.

The catalysts of the present invention are made by forming an oxide complex in a conventional manner except that at least some of the Group I, IIB and/or III elements of the catalysts are added by an impregnation technique using a solution of these elements to impregnate a preformed and calcined oxide complex of the other elements. Thus in accordance with the present invention, an oxide complex is formed by a conventional technique, this oxide complex containing all of the elements of the objective catalyst except for at least some of the Group I, IIB and/or III elements which will be added by subsequent impregnation. After this interim oxide complex is made, it is impregnated with a solution of a Group I, II and/or III element, dried and calcined to produce the objective catalyst.

Thus, in accordance with the first step of the present invention, an interim oxide complex is formed by a conventional technique. Most easily, this is accomplished by forming a solution of slurry, usually in water, of the elements to be incorporated into the interim oxide complex usually in the form of salts having heat decomposable anions or cations and/or oxides. The liquid slurry medium is removed from the slurry to form a precatalyst and the precatalyst is then calcined in air at elevated temperature, for example 600° to 900° C. for an extended period of time, 0.5 to 50 hours. During such calcination, care should be taken to avoid gross decomposition of the catalyst such as occurs in McClellan, U.S. Pat. No. 3,415,886.

In this regard, an essential feature of the McClellan technique is that the interim bismuth molybdate on silica material which is composed of various crystalline molybdates be heated under conditions which are so severe that these crystalline materials are substantially destroyed and replaced with a substantially amorphous phase. This procedure is totally avoided in accordance with the present invention whereby the catalysts produced have the conventional structure, i.e. they are substantially crystalline. Techniques for making oxide complexes in the conventional manner are well known and disclosed, for example, in Grasselli, U.S. Pat. No. 3,642,930, the disclosure of which is incorporated hereby by reference.

In another embodiment of the invention, the interim oxide complex can be a used catalyst, that is a catalyst which has already been used in an oxidation or ammoxidation type reaction to produce valuable product.

Once the interim oxide complex is produced as described above, it is impregnated in accordance with the present invention with a solution of a Group I, IIB or III element. In order to obtain dissolution of the Group I, IIB or III element, a compound of the element which is soluble in the liquid used to form the slurry is normally employed. For example, if water is chosen as the solution medium, nitrates of the elements can be used. On the other hand, if an organic liquid such as an alcohol is used as the liquid, organic compounds of the elements in question, such as for examples acetates can be employed. Also, it is possible to use the element directly if they can be made to dissolve in the appropriate liquid.

Commonly assigned U.S. Pat. No. 3,280,166 shows improving the properties of a bismuth molybdate or bismuth phosphomolybdate catalyst by impregnating the catalysts with materials which decompose to yield barium oxide and silicon oxide. Potassium silicate is an example of a material which will supply silicon for the silicon oxide. D'Armore, U.S. 4,052,332, discloses a process for rejuvenating used or spent iron bismuth molybdates in which the spent catalyst is impregnated with a solution containing bismuth and molybdenum. Alkali metal molybdates are examples of materials which can be used to supply molybdenum to the impregnating solution. In accordance with both these techniques, alkali metal would be deposited on the catalyst if a silicate or molybdate of an alkali metal were employed as a source compound, and therefore in accordance with the present invention silicates or molybdates of alkali metal are not employed as source compounds for supplying alkali metal to the impregnating solution.

The liquid used for the impregnating solution is not critical and both aqueous and organic liquids can be employed. For example, in addition to water, various alcohols and especially ethanol, propanol and so forth can be employed as can acetone, hydrocarbons, etc. Also, mixed systems can be employed. For example, solutions of water and various organic acids such as tartaric, oxalic, acetic, citric, chloroacetic acid and the like can be employed. Also, various compounds which aid solubility can also be included. For example, various mineral acids such as $HNO_3$, $H_2SO_4$, HCl, $H_3PO_4$ and the like can be included. Basically, any liquid can be employed so long as the liquid does not exhibit a significant adverse effect on the ultimate catalyst produced. For example, strong bases should be avoided since they may poison the ultimate catalyst product.

The impregnating element is deposited in the interim oxide complex by mixing the interim complex with the impregnating solution and thereafter removing the liquid. For ease of operation and control of the amount of impregnant deposited on the catalyst, this is usually accomplished by mixing the impregnating solution and the interim complex together and thereafter evaporating the impregnating liquid.

The concentration of impregnant in the impregnating liquid and the relative amounts of impregnating liquid and interim oxide and complex are not critical and can be easily selected by those skilled in the art to facilitate ease of impregnation. Usually, however, the amount of impregnating solution will be no more than 1.5, preferably 1.1, more preferably 1.0 times the pore volume of the interim catalyst to be impregnated.

Once the impregnating liquid is removed, the impregnated interim oxide complex is calcined at elevated temperature and pressure to set the impregnant metal into the catalyst and establish the final relationship of the atoms therein. Calcination is accomplished by heating at elevated temperature in the presence of an oxygen-containing gas, normally air, in a routine manner. For example, heating in accordance with the above-noted Grasselli patent, U.S. Pat. No. 3,642,930, is preferred. Again, care must be taken to avoid destruction of the crystalline bismuth molybdates as occurs in the above-noted McClellan patent.

The catalysts produced by the inventive process can be used in all oxidation-type reactions in which analogous catalysts are used, such as for example oxidation of olefins to produce aldehydes and acids, ammoxidation of olefins to produce unsaturated nitriles and oxydehydrogenation of olefins to produce diolefins.

The following examples are provided to more thoroughly describe the present invention.

COMPARATIVE EXAMPLE A

A silica-supported, alkali metal-promoted catalyst of the type shown in commonly assigned U.S. 3,642,930 was charged into a fluid-bed reactor and contacted with a feed comprising 1.8 propylene/2.2 $NH_3$/3.6 $O_2$/2.4 $N_2$/6 $H_2O$ at 430° C. for a contact time of 2 seconds. The gross reaction product obtained was recovered and analyzed and it was found that acrylonitrile was produced in yields of 77.6% based on the propylene fed with a selectivity to acrylonitrile of 82.2%.

EXAMPLE 1

Comparative Example A was repeated except that 25 gms. of the catalyst of Comparative Example A after being formed was impregnated with 20 gms. of an aqueous solution containing 0.042 gms. potassium acetate. After impregnation, the catalyst was washed with water, dried and then calcined in air at 570° C. for 3 hours. The potassium-impregnated catalyst was then used in the same way as in Comparative Example A to produce acrylonitrile. In this example, acrylonitrile was produced with yields of 80.0% based on the propylene fed with a selectivity to acrylonitrile of 81.8%.

EXAMPLE 2

Example 1 was repeated except the impregnating solution was composed of an aqueous solution of copper acetate, and the amount of copper impregnated in the catalyst was such that the copper content was $Cu_{0.2}$ based on 12 molybdenum atoms. In this example, acrylonitrile was produced with yields of 79.4% based on the propylene fed with a selectivity to acrylonitrile of 81.8%.

From the foregoing, it can be seen that catalysts of improved properties can be produced by forming the catalysts using an impregnating technique to incorporate at least some of the Group I, II or III elements into the catalyst.

Although only a few embodiments of the invention are described above, it should be appreciated that many modifications can be made without departing from the spirit and scope of the invention. All such modifications are intended to be included within the scope of the present invention, which is to be limited only by the following claims.

We claim:

1. A process for improving the catalytic performance of a substantially crystalline iron bismuth molybdate oxide complex interim catalyst to thereby produce a product catalyst of the formula:

$$A_aB_bC_cBi_dFe_eMo_fO_x$$

wherein
A is at least one element selected from the Group I, II and III elements;
B is one or more Group VIII elements other than Fe;
C is P, As, Sb, S, Te and/or Sn; and
wherein
a is 0.1–12;
b is 0.1–12;
c is 0.1–12;
d is greater than 0–12;
e is 0.1–12;
f is 0.1–12; and
x is a number determined by the valence requirements of the other elements present,
said interim oxide complex catalyst being produced by forming a pre-catalyst and thereafter calcining said pre-catalyst in an oxygen-containing gas, said process comprising (a) impregnating said interim catalyst with a solution of at least one element from Groups IA, IB, IIB, IIIA and IIIB of the Periodic Table, and (b) thereafter calcining the impregnated interim oxide complex in an oxygen-containing gas to thereby form said product catalyst, none of the Group IA elements incorporated into said catalyst by impregnation being derived from a molybdate or silicate.

2. The process of claim 1 wherein said solution is free of molybdenum and silicon.

3. The process of claim 1 wherein a is 0.1 to 6, b is 0.1 to 12, c is 0.1 to 12, d is greater than 0 to 4, e is 0.1 to 12 and f is 12.

4. The process of claim 3 wherein d is 0.1 to 5 and e is 1 to 5.

5. The process of claim 3 wherein said catalyst is defined by the formula $$I_mII_nIII_oB_pD_qFe_rBi_sMo_tO_x$$

wherein
I is at least one Group I element,
II is at least one Group II element,
III is at least one Group III element,
B is at least one of Co, Ni, Mg;
D is P, As, Sb, Te and/or Sn; and
wherein
m is 0 to 1;
n is 0 to 12;
o is 0 to 12;
m+n+o is 0.1 to 12
p is 0 to 10;
q is 0 to 6;
r is 1 to $\frac{1}{2}$t;
s is 0.5 to $\frac{1}{2}$t;
t is 8 to 16;
x is a number determined by the valence requirements of the other elements present.

6. The process of claim 5 wherein I is K, Rb, Cs and/or Cu, wherein II is Mg, Ca and/or Zn and III is Al and/or Tl.

7. The process of claim 1 wherein B contains at least one of Co or Ni.

8. The process of claim 6 wherein B further contains at least one Cr, Mn and Mg.

* * * * *